(12) United States Patent
Harashima (10) Patent No.: US 8,439,350 B2
(45) Date of Patent: May 14, 2013

(54) IMAGE READING APPARATUS AND IMAGE FORMING APPARATUS

(75) Inventor: Yuichi Harashima, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 18 days.

(21) Appl. No.: 13/317,552

(22) Filed: Oct. 21, 2011

(65) Prior Publication Data

US 2012/0098187 A1    Apr. 26, 2012

(30) Foreign Application Priority Data

Oct. 25, 2010 (JP) ................................. 2010-238765

(51) Int. Cl.
*B65H 3/06* (2006.01)
*H04N 1/04* (2006.01)

(52) U.S. Cl.
USPC .............. 271/109; 271/314; 492/39; 358/498

(58) Field of Classification Search .................. 271/109, 271/314; 492/39; 358/498
See application file for complete search history.

(56) References Cited

U.S. PATENT DOCUMENTS

| 4,473,221 A * | 9/1984 | Arai ............................... 271/109 |
| 7,636,181 B2 * | 12/2009 | Iwasaki ........................... 358/483 |
| 8,199,377 B2 * | 6/2012 | Wakisaka et al. ............. 358/475 |
| 2011/0051200 A1 * | 3/2011 | Iwasaki et al. ................ 358/474 |

FOREIGN PATENT DOCUMENTS

| JP | 59105762 A | 6/1984 |
| JP | 3756474 | 1/2006 |

OTHER PUBLICATIONS

Abstract of JP 2004-104563 published on Apr. 2, 2004.

* cited by examiner

*Primary Examiner* — Luis A Gonzalez
(74) *Attorney, Agent, or Firm* — Harness, Dickey & Pierce, P.L.C.

(57) ABSTRACT

In an image reading apparatus, the linear coefficients of expansion of conveyance drive rollers and a linear coefficient of expansion of the holding unit are determined such that the amount of change in the outer diameter of each of the conveyance drive rollers due to a change in temperature environment is substantially the same as the amount of change in the interval between the first reading unit and the second reading unit due to a change in the temperature environment. The conveyance drive rollers are attached to a rotary shaft such that the positions of head portions of screws are alternately located along the axis direction of the rotary shaft on opposite sides of the outer circumference surface in a direction perpendicular to the axis direction of the rotary shaft.

5 Claims, 9 Drawing Sheets

IN CASE OF EPDM RUBBER

| THICKNESS / TEMPERATURE | 0.03 mm | 0.05 mm | 0.1 mm | 0.5 mm | 1 mm | 16 mm |
|---|---|---|---|---|---|---|
| 10 deg | ○ | ○ | ○ | ○ | △ | × × × |
| 15 deg | ○ | ○ | ○ | △ | △ | × × × × |
| 20 deg | ○ | ○ | △ | △ | × | × × × × |
| 30 deg | △ | △ | △ | × | × | × × × × |
| 40 deg | △ | △ | × | × | × × | × × × × |

IN CASE OF URETHANE RUBBER

| THICKNESS / TEMPERATURE | 0.03 mm | 0.05 mm | 0.1 mm | 0.5 mm | 1 mm | 16 mm |
|---|---|---|---|---|---|---|
| 10 deg | ○ | ○ | ○ | ○ | ○ | × × |
| 15 deg | ○ | ○ | ○ | ○ | △ | × × × |
| 20 deg | ○ | ○ | ○ | △ | △ | × × × |
| 30 deg | △ | △ | △ | △ | × | × × × × |
| 40 deg | △ | △ | △ | × | × | × × × × |

| MATERIAL OF CONVEYANCE DRIVE ROLLER | LINEAR COEFFICIENT OF EXPANSION | | SPECIFIC WEIGHT | | WARPING OF ASSEMBLY | |
|---|---|---|---|---|---|---|
| BRASS | LOW | ○ | 8.4 | × × | 8 mm | × × |
| RESIN | LOW | ○ | 1.9 | ○ | 3 mm | ○ |
| RUBBER | HIGH | × × | 1 | ◎ | 3 mm | ◎ |

DOCUMENT CONVEYING DIRECTION

FIG.17B

DOCUMENT CONVEYING DIRECTION

DELAY TIME T (DISTANCE L)

DOCUMENT CONVEYING DIRECTION

IMAGE READING APPARATUS AND IMAGE FORMING APPARATUS

CROSS-REFERENCE TO RELATED APPLICATIONS

The present application claims priority to and incorporates by reference the entire contents of Japanese Patent Application No. 2010-238765 filed in Japan on Oct. 25, 2010.

BACKGROUND OF THE INVENTION

1. Field of the Invention

The present invention relates to an image reading apparatus, such as a stand-alone scanner apparatus or a scanner apparatus installed in a copier or facsimile apparatus, and to an image forming apparatus, such as a copier or multifunction peripheral, that includes an image reading apparatus, and, more particularly, to an image reading apparatus that reads a document image by using reading units that are divided in the main scanning direction and to an image forming apparatus.

2. Description of the Related Art

Figure 16:
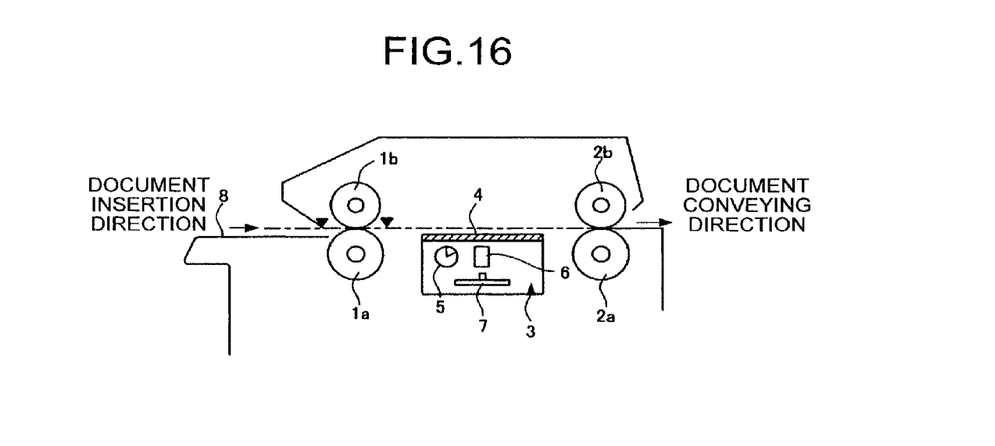
FIG. 16 is a schematic configuration diagram of a conventional image reading apparatus.

An image reading apparatus, such as a stand-alone scanner apparatus or a scanner apparatus installed in a copier or facsimile apparatus, includes a conveyance drive roller 1a and a conveyance follower roller 1b that convey a document, which is placed on a document table 8 and inserted in an insertion direction, as illustrated in FIG. 16; a conveyance drive roller 2a and a conveyance follower roller 2b; and a read sensor 3 (including a light source 5, a Selfoc lens 6, and a light receiving element 7, such as a charge-coupled device) that reads an image of a document from below a contact glass 4.

The conveyance drive roller 1a, the conveyance follower roller 1b, the conveyance drive roller 2a, and the conveyance follower roller 2b each have a rubber layer formed on the outer circumference thereof. Because the rubber layer contracts or expands due to a change in the surrounding temperature, the outer diameter of each of the conveyance drive roller 1a, the conveyance follower roller 1b, the conveyance drive roller 2a, and the conveyance follower roller 2b is changed when there is a change in the temperature.

Figure 17A:
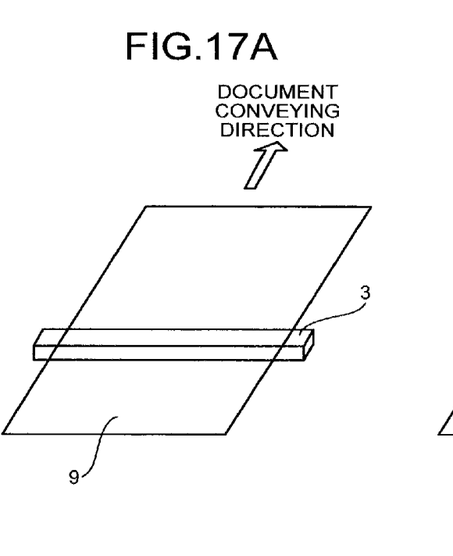
FIGS. 17A and 17B are perspective views that illustrate the configuration of a conventional read sensor.

As illustrated in FIG. 17A, the length of the read sensor 3 in the longitudinal direction (the document width direction) is designed to cover the maximum width of a document 9 to be read. The provision of the read sensor 3 allows acquisition of high-quality images with a simple configuration and image processing without being affected by a change in the outer diameters of the conveyance drive roller 1a, the conveyance follower roller 1b, the conveyance drive roller 2a, and the conveyance follower roller 2b.

The cost of components of a read sensor increases exponentially in relation to the length of the read sensor in the width direction. If a reading unit includes a single read sensor 3, as illustrated in FIG. 17A, the cost of the image reading apparatus is increased.

Figure 17B:
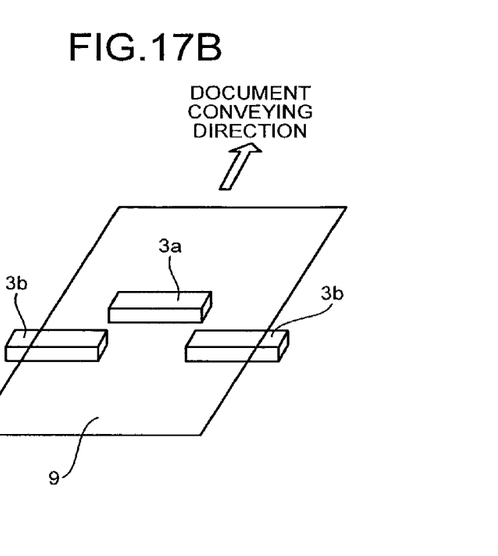

As illustrated in FIG. 17B, in some configurations, three read sensors 3a and 3b, each having a smaller width than the maximum width of the document 9, are arranged in two rows in, what is called, a staggered manner (for example, see Japanese Patent Application Laid-open No. S59-105762).

If the image reading apparatus illustrated in FIG. 16 uses the read sensors 3a, 3b illustrated in FIG. 17B, the image reading apparatus needs to include an image processing unit for combining sets of digital image data that are obtained by performing analog processing, analog-digital conversion processing, and the like on sets of analog image data acquired by the read sensors 3b and 3b at different timings. In order to connect the images correctly, it is necessary to ensure the positional accuracy of the read sensors 3a and 3b. The positional accuracy of the read sensors 3a and 3b is ensured by ensuring the accuracy of components and by adjusting the installation of components.

In a conventional image reading apparatus, such as that described above, the outer diameters of the conveyance drive rollers 1a and 2a, which convey a document to a read position, change due to changes in the temperature, and the speed for conveying a document is also changed in accordance with a change in the outer diameters of the conveyance drive rollers 1a and 2a; therefore, if the read sensors 3a and 3b, each having a smaller width than the maximum width of a document, are arranged in a staggered manner, image misalignment in the conveying direction occurs at the connection area of the images read by the read sensors 3a and 3b.

Figures 18A, 18B:
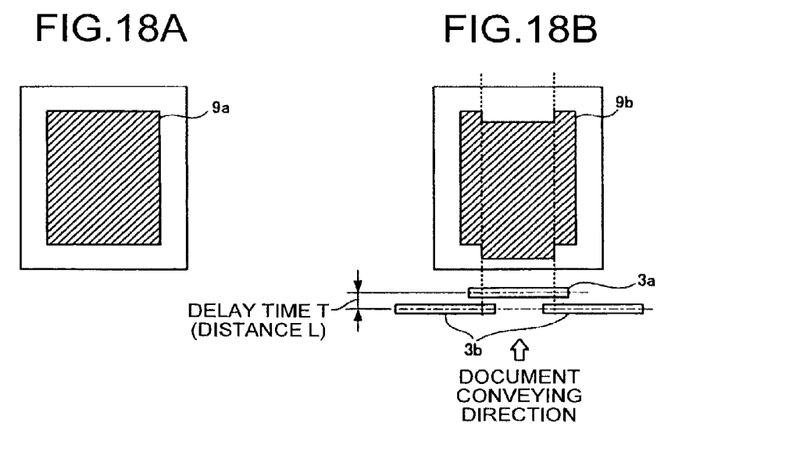
FIGS. 18A and 18B are diagrams that illustrate image misalignment in a conventional image reading apparatus.

FIGS. 18A and 18B illustrate an example of the above-described image misalignment. An image 9a, as illustrated (with diagonal lines) in FIG. 18A, is not affected by a change in the outer diameters of the conveyance drive rollers 1a and 2a and is obtained by correctly combining sets of image data acquired by a plurality of read sensors.

If the document conveying speed is changed in accordance with a change in the outer diameters of the conveyance drive rollers 1a, 2a, although the image processing unit combines the images taking into consideration the delay time T due to the distance L between the read sensors 3a and 3b in the conveying direction, image misalignment in the conveying direction (the sub-scanning direction) occurs at the image connection area (indicated by a dashed line in the drawing) on an image 9b, as illustrated (with diagonal lines) in FIG. 18B.

Japanese Patent No. 3756474 discloses a technique that prevents the occurrence of image misalignment in the conveying direction at an image connection area if the document conveying speed is changed in accordance with a change in the outer diameters of the conveyance drive rollers 1a and 2a as described above.

Japanese Patent No. 3756474 discloses an image reading apparatus that includes a first sensor that reads a part of a document that is divided in the main scanning direction; a second sensor that is located downstream in the sub-scanning direction of the first sensor and that reads a different part of the document other than the part of the document; a conveyance drive roller that conveys a document to the first and second sensors; a core bar to which the conveyance drive roller is attached such that the core bar rotates the conveyance drive roller; a delay unit that delays an output signal from the first sensor in accordance with the set interval between the first sensor and the second sensor in the sub-scanning direction; an image combining unit that combines the first sensor output signal delayed by the delay unit with an output signal from the second sensor so as to obtain image signals; and an adjusting unit that adjusts the interval between the first sensor and the second sensor in accordance with a change in the conveying speed of the conveyance drive roller.

In this image reading apparatus, the interval (the set interval) between the first sensor and the second sensor is changed in accordance with any change in the conveying speed due to thermal expansion and thermal contraction of the conveyance drive roller; therefore, while the delay time pre-set in the delay unit is used, the occurrence of image misalignment in the conveying direction is avoided when a partial image (a part of an image) read by the first sensor is combined with a partial image (a different part of the image other than the part of the image) read by the second sensor.

Such a conventional image reading apparatus does not take a measure to prevent warping of the core bar when the conveyance drive rollers are fixed to the core bar.

Specifically, if a plurality of conveyance drive rollers is attached to a rotary shaft such that the outer circumference surfaces of the conveyance drive rollers are in contact with a document, a small-diameter rotary portion is formed on the conveyance drive roller, extending in the main scanning direction, and a through-hole, through which a screw is inserted, is formed on the small-diameter rotary portion.

A screw hole, with which a screw is engaged, is formed on one side of a rotary shaft in a direction perpendicular to the axis direction of the rotary shaft. The screw holes are formed on the rotary shaft with a space interposed therebetween in the axis direction of the rotary shaft.

To fix a conveyance drive roller to the rotary shaft, after the conveyance drive roller is attached to the rotary shaft, a screw is inserted into the through-hole on one side of the rotary shaft and engaged with the screw hole of the rotary shaft.

The conveyance drive roller is fixed to the rotary shaft, as described above, so that it is possible to prevent the head portion of the screw from protruding outward from the outer circumference surface of the conveyance drive roller such that the head portion of the screw is not brought into contact with a document.

However, when the conveyance drive rollers are fixed to the rotary shaft, the screws are attached to one side of the rotary shaft, which results in the application of fastening forces only to one side of the rotary shaft.

Therefore, the rotary shaft warps in a direction perpendicular to the rotation center of the rotary shaft, and during rotation of the rotary shaft, the rotary shaft is moved in a direction perpendicular to the rotation center of the rotary shaft. Thus, a change in the conveying speed of the conveyance drive roller due to thermal expansion and thermal contraction becomes significant because of the movement of the rotary shaft in a direction perpendicular to the rotation center, and therefore there is a possibility that it is not possible to avoid the occurrence of image misalignment in the conveying direction at the image connection area.

Particularly, when a document with a large reading width is read, it is necessary to attach a large number of conveyance drive rollers to a longer rotary shaft; therefore, in the case of a longer rotary shaft, warping of the rotary shaft becomes more significant.

SUMMARY OF THE INVENTION

It is an object of the present invention to at least partially solve the problems in the conventional technology.

According to an aspect of the present invention, there is provided an image reading apparatus including a first reading unit; a second reading unit; a conveying unit; a holding unit; a delay unit; and an image combining unit. The first reading unit reads a first region of a document that is divided in a main scanning direction. The second reading unit is located downstream in a sub-scanning direction of the first reading unit and reads a second region of the document other than the first region of the document. The conveying unit conveys a document to the first reading unit and the second reading unit. The conveying unit includes a plurality of conveyance drive rollers made of resin and that each having an outer circumference surface in contact with a document during conveyance of the document; a rotary shaft which extends in the main scanning direction and to which the conveyance drive rollers are attached in an axis direction of the rotary shaft with a space interposed therebetween, the rotary shaft rotating the conveyance drive rollers; and a plurality of conveyance follower rollers that are rotated together with the conveyance drive rollers. The holding unit is made of metal and has the first reading unit and the second reading unit fixed thereto in a manner to maintain a certain interval between the first reading unit and the second reading unit. The delay unit delays an output signal from the first reading unit in accordance with the interval between the first reading unit and the second reading unit in the sub-scanning direction. The image combining unit combines the output signal that has been output from the first reading unit and delayed by the delay unit with an output signal from the second reading unit so as to obtain image signals. Linear coefficients of expansion of the conveyance drive rollers and a linear coefficient of expansion of the holding unit are determined such that an amount of change in an outer diameter of each of the conveyance drive rollers due to a change in temperature environment is substantially the same as an amount of change in the interval between the first reading unit and the second reading unit due to a change in the temperature environment. The rotary shaft has a plurality of screw fastening portions formed in the axis direction of the rotary shaft with a space interposed between each of the screw fastening portions. The conveyance drive roller includes a large-diameter rotary portion that has an outer circumference surface in contact with a document; a small-diameter rotary portion that is protruded from the large-diameter rotary portion in the main scanning direction and that has a smaller diameter than the large-diameter rotary portion; and a through-hole that is formed on the small-diameter rotary portion and through which a screw is inserted so as to be fastened into the screw fastening portion. The conveyance drive rollers are attached to the rotary shaft such that positions of head portions of the screws are alternately located along the axis direction of the rotary shaft on opposite sides of the outer circumference surface in a direction perpendicular to the axis direction of the rotary shaft.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 5A to 5C are diagrams that illustrate an embodiment of the image reading apparatus and the image forming apparatus according to the present invention.

FIGS. 7A to 7C are diagrams that illustrate an embodiment of the image reading apparatus and the image forming apparatus according to the present invention.

DETAILED DESCRIPTION OF THE PREFERRED EMBODIMENTS

Exemplary embodiments of the present invention are explained in detail below with reference to the accompanying drawings.

FIGS. 1 to 15 are diagrams that illustrate an embodiment of an image reading apparatus and an image forming apparatus according to the present invention and that illustrate an example where the image forming apparatus is used as a wide-width digital copier that includes an image reading apparatus such as a scanner apparatus.

In the present embodiment, an explanation is given of a configuration in which the image forming apparatus of the present invention is a digital copier; however, the image forming apparatus may be, for example, a facsimile apparatus, or a multifunction peripheral that has facsimile and copy functions.

First, the configuration is explained.

Figure 1:
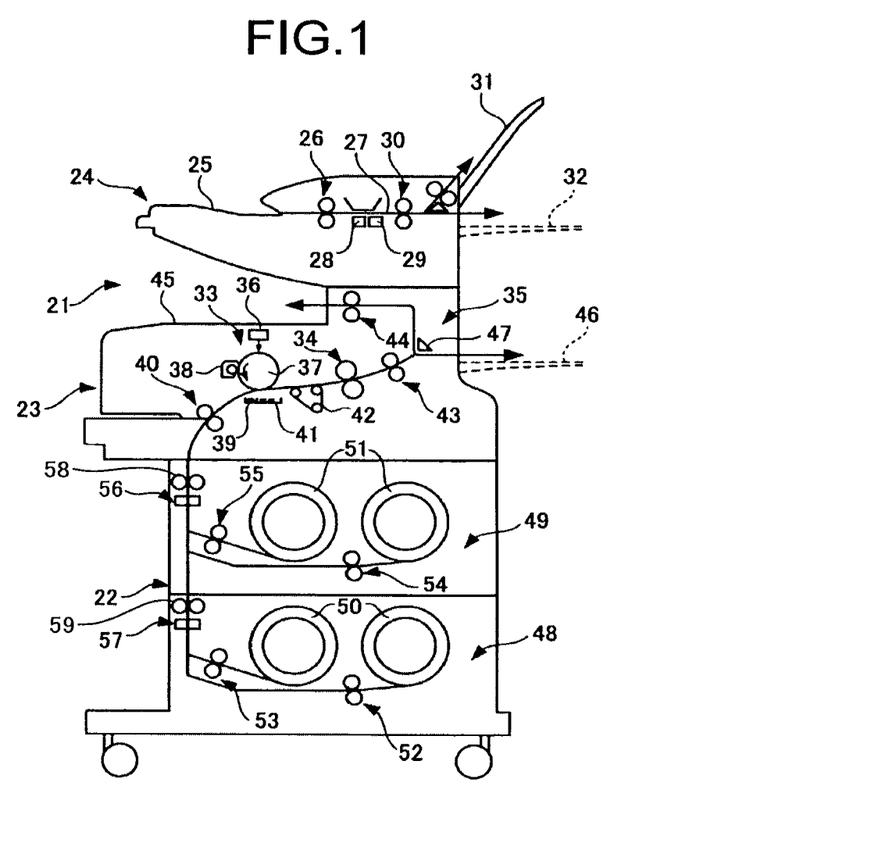
FIG. 1 is a diagram that illustrates an embodiment of an image reading apparatus and an image forming apparatus according to the present invention and is a schematic configuration diagram of a digital copier.

As illustrated in FIG. 1, a digital copier 21 includes the following, which as a whole constitute the digital copier 21: a feeding device 22, a copier main body 23 installed on the top of the feeding device 22, and a scanner apparatus 24, which is an image reading apparatus, installed on the top of the copier main body 23.

In the scanner apparatus 24, documents are placed on a document placement board 25 such that the image surface thereof faces downward, and a pair of conveying rollers 26 feeds the documents one by one to a document conveying path 27. Document images are read by a first read sensor 28, which is a first reading unit, and a second read sensor 29, which is a second reading unit, on the document conveying path 27.

After the images have been read, the document is discharged to a discharge tray 31 or 32 by a pair of conveying rollers 30. The pairs of conveying rollers 26 and 30 constitute a conveying unit.

The copier main body 23 includes an image forming unit 33, a fixing unit 34, and a discharging unit 35. Image signals read by the first read sensor 28 and the second read sensor 29, which are explained later, are subjected to image processing; an electrostatic latent image is formed on the uniformly charged surface of a photosensitive member 37 by an LED write device 36 that operates on the basis of the image signals having been subjected to the image processing; and the electrostatic latent image is developed as a toner image by a developing unit 38.

The toner image formed on the photosensitive member 37 is transferred by a transferring unit 39 onto a recording medium that is fed from the feeding device 22. The feeding is synchronized by a registration roller 40 with the timing of the image formation.

In the present embodiment, the photosensitive member 37, the developing unit 38, and the transferring unit 39 constitute the image forming unit 33, and the image forming unit 33 constitutes an image forming unit.

After the toner image has been transferred onto the sheet, the sheet is separated from the photosensitive member 37 by a separating unit 41, guided to the fixing unit 34 by a conveying belt 42, and then subjected to a fixing process by the fixing unit 34, which applies heat and pressure to the sheet.

After the image has been fixed to the recording medium, the recording medium is discharged by the discharging unit 35, which includes a plurality of discharging rollers 43, 44, into a discharge stage 45 located on the top surface of the copier main body 23 or into a discharge tray 46 located on the rear side of the copier main body 23. The direction in which a recording medium is discharged by the discharging unit 35 is changed, due to the rotation of a separating claw 47, to the direction toward the discharge stage 45 or to the direction toward the discharge tray 46.

The feeding device 22 includes two sheet roll trays 48 and 49, which are arranged one on top of the other. The sheet roll trays 48 and 49 in FIG. 1 can be pulled out to the left from the main body of the feeding device 22. While the sheet roll trays 48 and 49 are pulled out, a sheet roll is set or a process for a jam is performed.

Two sheet rolls 50 can be set in the sheet roll tray 48, and two sheet rolls 51 can be set in the sheet roll tray 49. Feeding rollers 52 and 53 are located near the sheet roll 50, and feeding rollers 54 and 55 are located near the sheet roll 51.

Recording media are fed by the feeding rollers 52 to 55, cut off at a constant length by roll cutter units 56 and 57, which are located on the trays on the left side (the front side) in FIG. 1, and then conveyed as sheet-like recording media to the copier main body 23 by conveying rollers 58 and 59.

Figure 2:
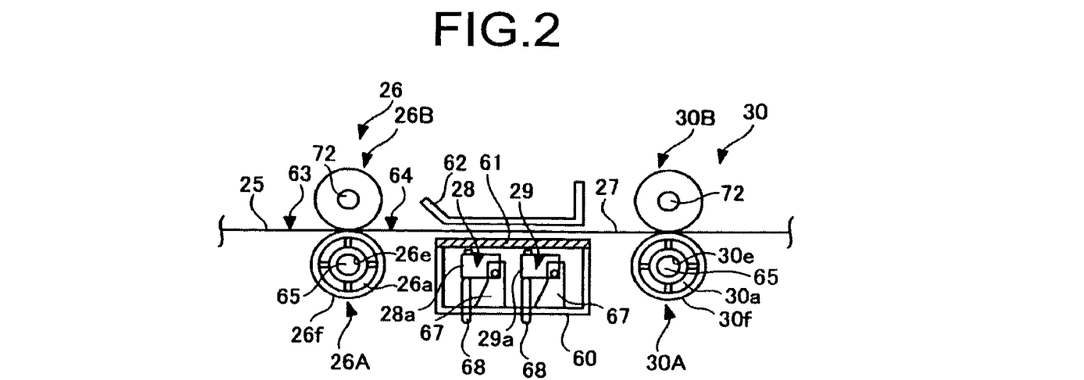
FIG. 2 is a diagram that illustrates an embodiment of the image reading apparatus and the image forming apparatus according to the present invention and is a schematic configuration diagram of the image reading apparatus.

As illustrated in FIG. 2, a first document sensor 63 is located upstream of the pair of conveying rollers 26. The first document sensor 63 detects a document that has been inserted from the document placement board 25 and has reached a predetermined position on the upstream side of the pair of conveying rollers 26 in the document conveying direction. The pair of conveying rollers 26 includes a conveyance drive roller 26A and a conveyance follower roller 26B, which is rotated together with the conveyance drive roller 26A. In the following descriptions, the document conveying direction is simply referred to as the conveying direction.

A second document sensor 64 is located downstream in the sub-scanning direction of the first document sensor 63. The second document sensor 64 detects a document that has been inserted from the document placement board 25 and has reached a predetermined position on the downstream side of the pair of conveying rollers 26 in the conveying direction. The sub-scanning direction is the same as the document conveying direction.

The first read sensor 28 and the second read sensor 29 are attached to a supporting stage 60, which is a part of a lower structural body 24B of the scanner apparatus 24. A contact glass 61 is mounted on the top surface of the supporting stage 60.

Figure 3:
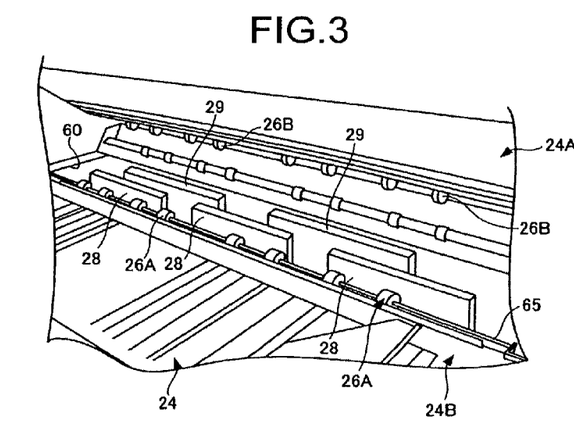
FIG. 3 is a diagram that illustrates an embodiment of the image reading apparatus and the image forming apparatus according to the present invention and is a perspective view of the main part of the image reading apparatus.

As illustrated in FIG. 3, the scanner apparatus 24 includes an upper structural body 24A that can open and close the lower structural body 24B. A pressure plate 62 illustrated in FIG. 2 is attached to the upper structural body 24A. FIG. 3 illustrates a state where the cover for the conveyance drive roller 26A, the first read sensor 28, and the second read sensor 29 is removed from the lower structural body 24B.

The pressure plate 62 guides the document conveyed by the pair of conveying rollers 26 to a read position on the contact glass 61. The pressure plate 62 is also used as a white reference for image reading.

The supporting stage 60 contains the first read sensor 28, the second read sensor 29, and the like. The components of the first read sensor 28, the second read sensor 29, and the like, read a conveyed document from below the contact glass 61.

Specifically, the first read sensor 28 reads a first region of the document divided into regions in the main scanning direction. The second read sensor 29 is located downstream in the sub-scanning direction of the first read sensor 28 and reads a second region of the document other than the first region of the document. In the present embodiment, the three first read sensors 28 and the two second read sensors 29 are attached to the supporting stage 60 in the staggered manner illustrated in FIG. 3.

The first read sensor 28 and the second read sensor 29 include linear sensor units each including a well-known light source (exposure lamp), a Selfoc lens array, a charge-coupled device (CCD), and the like, in chassis 28a, 29a.

The conveyance drive roller 26A rotates so that a document inserted from the document placement board 25 is conveyed to a read position on the contact glass 61. The conveyance drive roller 26A is rotatably attached to the lower structural body 24B.

The conveyance follower roller 26B is in contact with the conveyance drive roller 26A with a predetermined nip pressure during rotation. The conveyance follower roller 26B conveys a document inserted from the document placement board 25 to a read position on the contact glass 61. The conveyance follower roller 26B is attached to the upper structural body 24A.

The pair of conveying rollers 30 conveys a document, for which reading has been finished, to a discharge position from the read position on the contact glass 61. The pair of conveying rollers 30 includes a conveyance drive roller 30A that is attached to the lower structural body 24B; and a conveyance follower roller 30B that is attached to the upper structural body 24A and is in contact with the conveyance drive roller 30A with a predetermined nip pressure during rotation so that the read document is conveyed from the read position on the contact glass 61 to the discharging unit.

Figure 4:
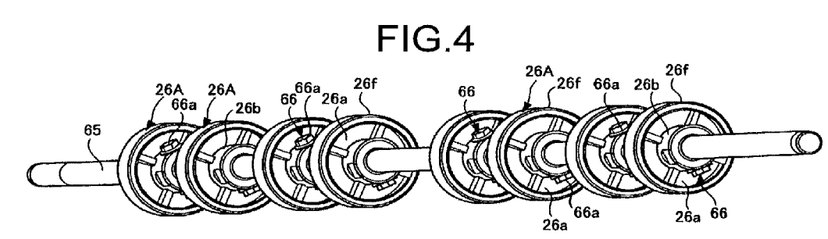
FIG. 4 is a diagram that illustrates an embodiment of the image reading apparatus and the image forming apparatus according to the present invention and is a perspective view of the assembly of conveyance drive rollers and a drive shaft on one side.

As illustrated in FIGS. 2 and 4, the conveyance drive roller 26A of the pair of conveying rollers 26 is attached to a metallic rotary shaft 65. Eight conveyance drive rollers 26A are attached to the rotary shaft 65 with a space interposed therebetween in the axis direction of the rotary shaft 65 (in the main scanning direction).

Figure 5A:
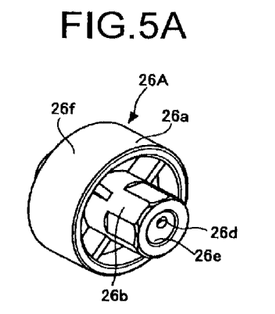
FIG. 5A is a perspective view of the conveyance drive roller on one side.
Figure 5B:
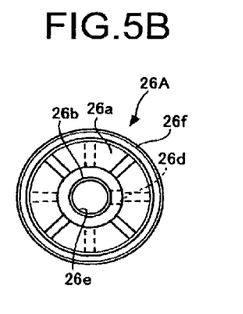
FIG. 5B is a front view of the conveyance drive roller on one side.
Figure 5C:
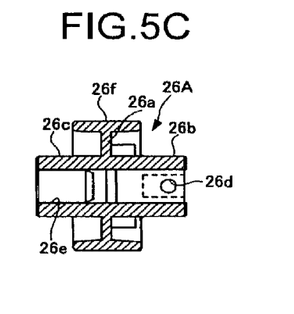
FIG. 5C is a cross-sectional view of the conveyance drive roller on one side.

The conveyance drive roller 26A is made of a resin material, such as PPS. As illustrated in FIGS. 5A to 5C, the conveyance drive roller 26A includes a large-diameter rotary portion 26a, whose outer circumference surface is in contact with a document; and small-diameter rotary portions 26b and 26c, which are protruded from the large-diameter rotary portion 26a in the main scanning direction and have a smaller diameter than the large-diameter rotary portion 26a. A through-hole 26d, through which a screw 66 illustrated in FIG. 4 is inserted, is formed on the small-diameter rotary portion 26b. The through-hole 26d is not formed on the small-diameter rotary portion 26c.

A through-hole 26e is formed in the rotation center of the conveyance drive roller 26A. The rotary shaft 65 is inserted through the through-hole 26e.

The conveyance drive roller 26A is subjected to a cutting process, or the like, and during the cutting process, the large-diameter rotary portion 26a is subjected to a process for hollowing out the inside thereof.

Figure 6:
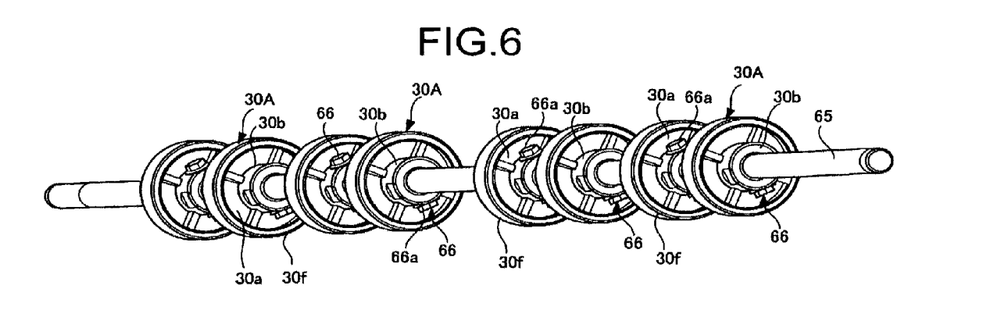
FIG. 6 is a diagram that illustrates an embodiment of the image reading apparatus and the image forming apparatus according to the present invention and is a perspective view of the assembly of conveyance drive rollers and a drive shaft on the other side.

The conveyance drive roller 30A is made of a resin material, such as PPS. As illustrated in FIGS. 6 and 7A to 7C, the conveyance drive roller 30A includes a large-diameter rotary portion 30a, whose outer circumference surface is in contact with a document; and small-diameter rotary portions 30b and 30c, which are protruded from the large-diameter rotary portion 30a in the main scanning direction and have a smaller diameter than the large-diameter rotary portion 30a. A through-hole 30d, through which the screw 66 illustrated in FIG. 6 is inserted, is formed on the small-diameter rotary portions 30b and 30c. The screw 66 has a head portion 66a. The head portion 66a is operated by a tool so that the screw is fastened.

Figure 7A:
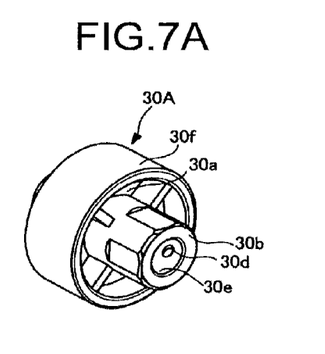
FIG. 7A is a perspective view of the conveyance drive roller on the other side.
Figure 7B:
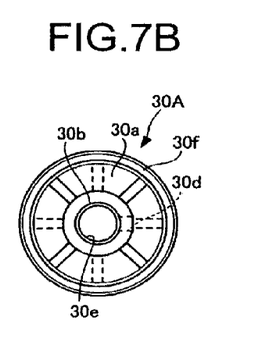
FIG. 7B is a front view of the conveyance drive roller on the other side.
Figure 7C:
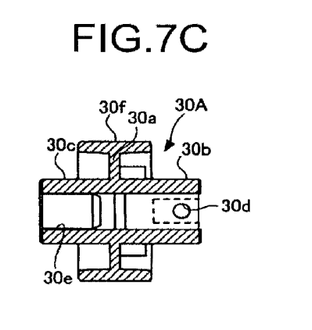
FIG. 7C is a cross-sectional view of the conveyance drive roller on the other side.

A through-hole 30e is formed in the rotation center of the conveyance drive roller 30A. The rotary shaft 65 is inserted through the through-hole 30e.

The conveyance drive roller 30A is subjected to a cutting process, or the like, and, during the cutting process, the large-diameter rotary portion 30a is subjected to a process for hollowing out the inside thereof.

Figure 8:
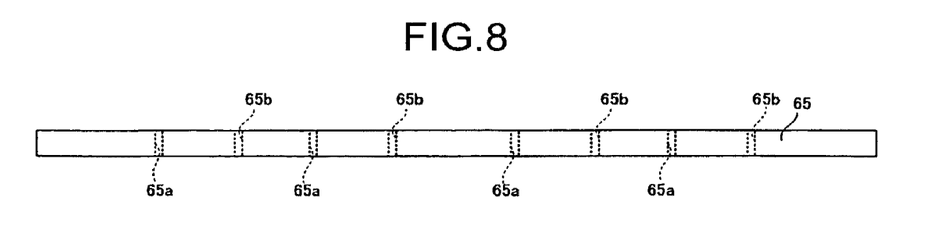
FIG. 8 is a diagram that illustrates an embodiment of the image reading apparatus and the image forming apparatus according to the present invention and is a front view of the drive shaft.

As illustrated in FIG. 8, screw holes 65a and 65b, which are screw fastening portions, are formed on the rotary shaft 65. The screw holes 65a and 65b are spaced apart from one another in the axis direction of the rotary shaft 65 (in the main scanning direction) and extend in a direction perpendicular to the axis direction of the rotary shaft 65.

When the conveyance drive roller 26A is attached to the rotary shaft 65, the rotary shaft 65 is inserted through the through-hole 26e, the screw 66 is inserted through the through-hole 26d, and the screw 66 is engaged with the screw holes 65a and 65b, whereby the conveyance drive roller 26A can be firmly fixed to the rotary shaft 65.

When the conveyance drive roller 30A is attached to the rotary shaft 65, the rotary shaft 65 is inserted through the through-hole 30e, the screw 66 is inserted through the through-hole 30d, and the screw 66 is engaged with the screw holes 65a and 65b, whereby the conveyance drive roller 30A can be firmly fixed to the rotary shaft 65.

Because the conveyance drive roller 26A and the conveyance drive roller 30A are made of a resin material, the outer circumference surfaces of the large-diameter rotary portions 26a and 30a have lower frictional resistance than rubber; thus, there is a possibility that sufficient force for conveying a document is not ensured.

In the present embodiment, coating layers 26f and 30f, which are made of a different material having higher frictional resistance, are formed on the outer circumference surfaces of the large-diameter rotary portions 26a and 30a, which are in contact with documents. The large-diameter rotary portions 26a and 30a are coated with a urethane material, which has higher frictional resistance, as the coating layers 26f and 30f.

In order to ensure adhesion between the coating layers 26f and 30f and the large-diameter rotary portions 26a and 30a, the coating layers 26f and 30f are adhered to the large-diameter rotary portions 26a and 30a, respectively, by a baking process at a temperature of more than 100° C. Thus, adhesion between the coating layers 26f and 30f and the large-diameter rotary portions 26a and 30a can be obtained.

In the present embodiment, because the coating layers 26f and 30f are made of urethane, the conveyance drive rollers 26A and 30A are made of a resin material, such as PPS, so that it is possible to prevent deformation during a baking process at a temperature of more than 100° C. and to maintain the accuracy of the outer diameters that are obtained when the large-diameter rotary portions 26a and 30a are subjected to a cutting process.

Figure 9:
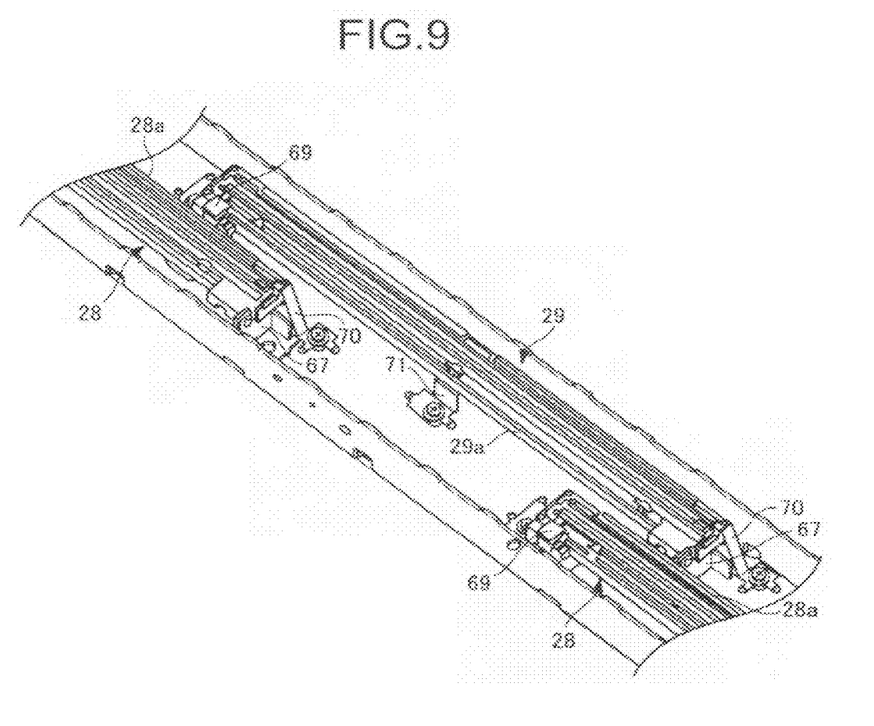
FIG. 9 is a diagram that illustrates an embodiment of the image reading apparatus and the image forming apparatus according to the present invention and is a perspective view of the main part of the image reading apparatus.
Figure 10:
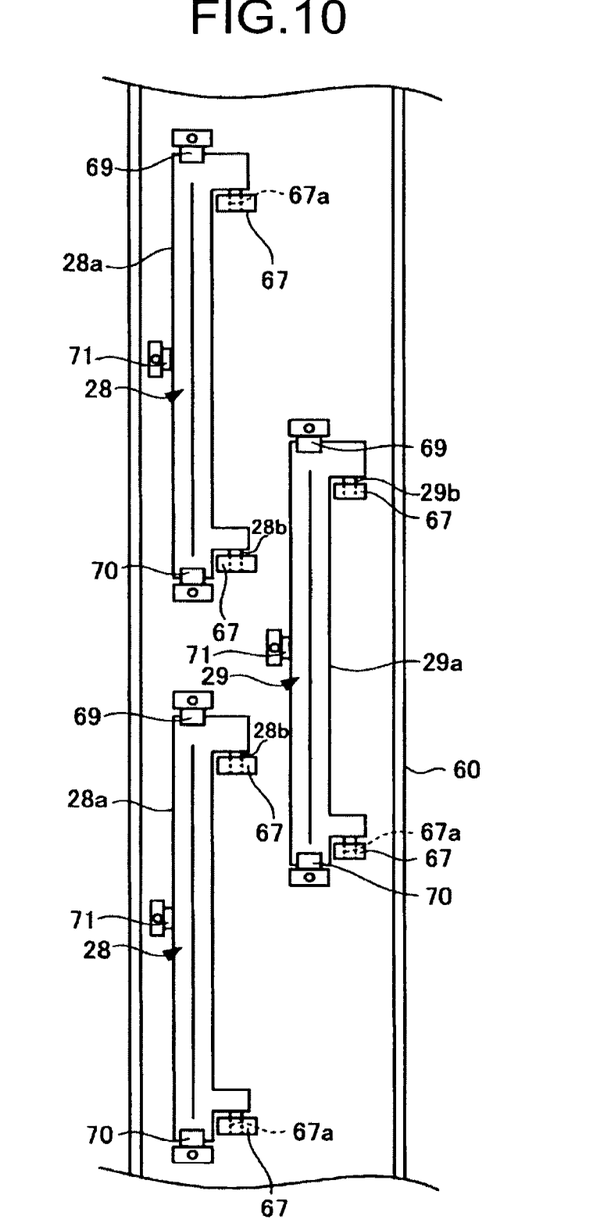
FIG. 10 is a diagram that illustrates an embodiment of the image reading apparatus and the image forming apparatus according to the present invention and is a plane view of the main part of the image reading apparatus and includes an illustration of the configurations of a first read sensor and a second read sensor.
Figure 11:
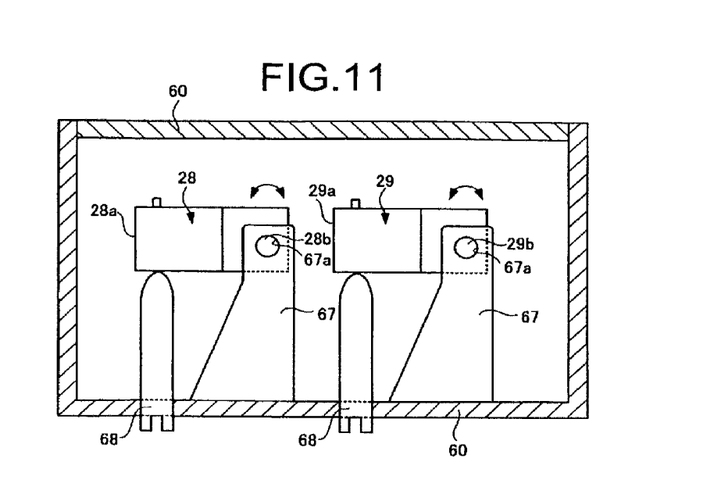
FIG. 11 is a diagram that illustrates an embodiment of the image reading apparatus and the image forming apparatus according to the present invention and is a side view of the main part of the image reading apparatus and includes an illustration of the configurations of the first read sensor and the second read sensor.

As illustrated in FIGS. 9 to 11, the first read sensor 28 and the second read sensor 29 are attached to the supporting stage 60 with brackets 67 made of a steel plate. The bracket 67 constitutes a holding unit.

The brackets 67 are located, in the main scanning direction, at the ends of the chassis 28a of the first read sensor 28 and at the ends of the chassis 29a of the second read sensor 29. A fitting hole 67a is formed on the upper end of the bracket 67.

Projections 28b and 29b are formed on the chassis 28a and 29a of the first read sensor 28 and the second read sensor 29. The projections 28b and 29b fit into the fitting holes 67a so that the chassis 28a and 29a are attached to the brackets 67 such that the chassis 28a and 29a are rotated about the projections 28b and 29b as the rotation center in the main scanning direction.

As illustrated in FIGS. 2 and 11, focus adjustment screws 68 are screwed into the supporting stage 60. The focus adjustment screws 68 push up the first read sensor 28 and the second read sensor 29 from below so that the turning positions of the first read sensor 28 and the second read sensor 29 are adjusted and so that the distance (focus) from the first read sensor 28 and the second read sensor 29 to the contact glass 61 is adjusted.

As illustrated in FIGS. 9 and 10, pressing springs 69 and 70 are located, in the main scanning direction, at both ends of the chassis 28a of the first read sensor 28 and at both ends of the chassis 29a of the second read sensor 29 (not illustrated in FIG. 11). The pressing springs 69 and 70 are in contact with the upper ends of the chassis 28a and the upper ends of the chassis 29a so as to bias the chassis 28a and 29a downward so that the chassis 28a and 29a are pressed against the upper ends of the focus adjustment screws 68.

The chassis 28a and 29a are fixed to the brackets 67 such that the chassis 28a and 29a are rotated about the projections 28b and 29b as supporting points.

Pressing springs 71 are located, in the main scanning direction, in the substantially central portions of the chassis 28a and 29a. The pressing springs 71 press the chassis 28a and 29a in the sub-scanning direction so as to set the position of the chassis 28a and 29a in the sub-scanning direction.

As described above, the first read sensor 28 and the second read sensor 29 are supported on the brackets 67 and attached to the supporting stage 60 with a certain interval therebetween in the sub-scanning direction.

Each of the conveyance follower roller 26B and the conveyance follower roller 30B includes a rubber roller that is fixed to the outer circumference of a rotary shaft 72.

The linear coefficient of expansion of each of the conveyance drive rollers 26A and 30A and the linear coefficient of each of the brackets 67 are determined such that the amount of change in the outer diameter of each of the conveyance drive rollers 26A and 30A due to a change in the temperature environment of the digital copier 21 is substantially the same as the amount of change in the interval between the first read sensor 28 and the second read sensor 29 due to a change in the temperature environment of the digital copier 21.

Specifically, the large-diameter rotary portions 26a and 30a and the small-diameter rotary portions 26b, 26c, 30b, and 30c of the conveyance drive rollers 26A and 30A are made of PPS, which has a similar linear coefficient of expansion to a metallic material, and the brackets 67 are made of metal selected from materials that have a similar linear coefficient of expansion to PPS.

The linear coefficients of expansion of the conveyance drive rollers 26A and 30A and the brackets 67 are determined as described above so that the amount of change in the outer diameter of each of the conveyance drive rollers 26A and 30A due to a change in the temperature environment is substantially the same as the amount of change in the interval between the first read sensor 28 and the second read sensor 29; thus, compared to conventional technique, image misalignment in the conveying direction at the connection area of the first read sensor 28 and the second read sensor 29 is hardly noticeable, even if the document conveying speeds of the conveyance drive rollers 26A and 30A are changed.

The thickness and the linear coefficient of expansion of each of the coating layers 26f and 30f formed on the outer circumference surfaces of the large-diameter rotary portions 26a and 30a are determined such that, even if the outer diameters of the large-diameter rotary portions 26a and 30a are changed due to a change in the temperature environment, image misalignment in the conveying direction at the connection area of the first read sensor 28 and the second read sensor 29 is unnoticeable.

If the coating layers 26f and 30f are thin, there is a possibility of a decrease in the abrasion resistance. If the coating layers 26f and 30f are thick, changes in the outer diameters of the large-diameter rotary portions 26a and 30a due to a change in the temperature environment are greater because of the added coating layers 26f and 30f; thus, the amount of change in the outer diameters of the conveyance drive rollers 26A and 30A is greatly different from the amount of change in the interval between the first read sensor 28 and the second read sensor 29, which may result in noticeable image misalignment in the conveying direction at the connection area of the first read sensor 28 and the second read sensor 29.

In the present embodiment, the thickness and the linear coefficient of expansion of each of the coating layers 26f and 30f formed on the outer circumference surfaces of the large-diameter rotary portions 26a and 30a are determined such that, even if the outer diameters of the large-diameter rotary portions 26a and 30a are changed due to a change in the temperature environment, noticeable image misalignment in the conveying direction does not occur at the connection area of the first read sensor 28 and the second read sensor 29.

Because the conveyance follower rollers 26B and 30B are rotated together with the conveyance drive rollers 26A and 30A, changes in the outer diameters of the conveyance drive rollers 26A and 30A have a small effect on any change in the document conveying speed; therefore, it is not necessary to give consideration to the linear coefficients of expansion of the conveyance follower rollers 26B and 30B in relation to the linear coefficient of expansion of the bracket 67.

Figure 12:
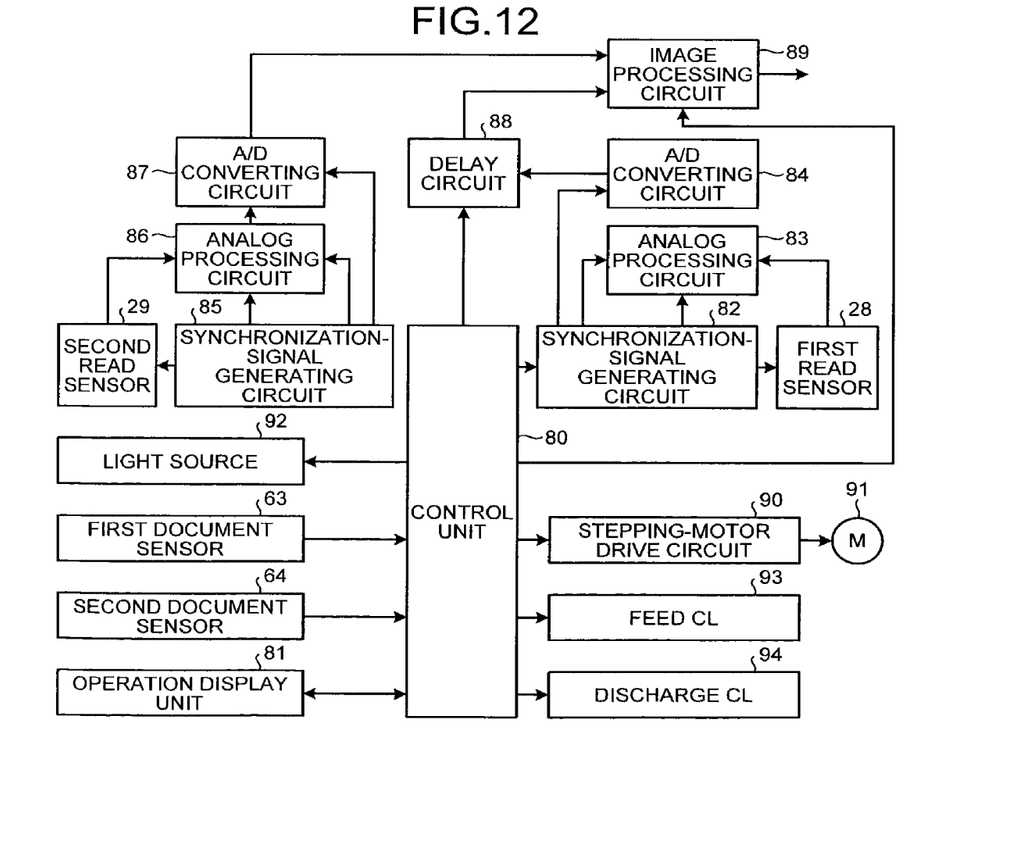
FIG. 12 is a diagram that illustrates an embodiment of the image reading apparatus and the image forming apparatus according to the present invention and that illustrates the circuit configuration of the digital copier.

Next, an explanation is given of the circuit configuration of the digital copier 21 with reference to FIG. 12.

As illustrated in FIG. 12, a control unit 80 includes a CPU, a memory (ROM/RAM, nonvolatile memory, or the like), an input/output unit (I/O), an interface, and the like. The control unit 80 receives a mode setting signal from an operation display unit 81 and a detection signal from the first document sensor 63, the second document sensor 64, and the like, and, by using such information, outputs switch signals and clock signals for on/off control.

The control unit 80 controls synchronization-signal generating circuits 82, 85 (included in an image combining unit), a delay circuit 88 (included in a delay unit), and an image processing circuit 89 (included in the image combining unit); controls the start of a stepping motor 91 via a stepping-motor drive circuit 90; controls turning on/off of a light source 92 for the first read sensor 28 and the second read sensor 29; and controls engagement/disengagement of a feed clutch (CL) 93 and a discharge clutch (CL) 94.

Under the above controls, the digital copier 21 of the present embodiment performs various operations including an operation for conveying a document at a pre-set speed and an operation for reading a document.

The synchronization-signal generating circuit 82 feeds clock and address signals, and the like, to the first read sensor 28, an analog processing circuit 83 (included in the image combining unit), and an A/D converting circuit 84 (included in the image combining unit).

The synchronization-signal generating circuit 85 feeds clock and address signals, and the like, to the second read sensor 29, an analog processing circuit 86 (included in the image combining unit), and an A/D converting circuit 87 (included in the image combining unit).

The analog processing circuit 83 has a function of adjusting the level of an analog image signal (included in an output signal) output from the first read sensor 28, a sample and hold function, and a variable-gain amplification (AGC) function.

The analog processing circuit 86 has a function of adjusting the level of an analog image signal (included in an output signal) output from the second read sensor 29, a sample and hold function, and a variable-gain amplification (AGC) function.

The A/D converting circuits 84, 87 convert analog image signals received from the analog processing circuits 83, 86, respectively, into 8-bit digital image signals (256 tones).

If there is no document under the pressure plate 62 and if the pressure plate 62 is set as a white portion, an automatic gain control (AGC) circuit (not shown) controls AGC amplification such that the largest value, in the main scanning direction, of the outputs from the A/D converting circuits 84, 87 becomes a predetermined value (for example, 220).

An AGC operation may be performed when a main switch (SW) is turned on to start the image reading apparatus.

A shading correction circuit (not shown) corrects the distribution variation of the light intensity of the light source 92 in the main scanning direction and corrects any variation of image signals in the main scanning direction due to the output characteristics of the charge-coupled devices (CCDs) included in the first read sensor 28 and the second read sensor 29 up to the A/D converting circuits 84 and 87.

In order to correct image misalignment in the conveying direction due to the interval (corresponding to the distance L illustrated in FIG. 18B) between the first read sensor 28 and the second read sensor 29 in the sub-scanning direction, the delay circuit 88 temporarily stores in a memory a digital image signal (included in an output signal) that is converted by the A/D converting circuit 84 after an analog image signal is obtained by the first read sensor 28 on a line by line basis. Thus, the digital image signal is delayed in accordance with the predetermined delay time T (illustrated in FIG. 18B).

The image processing circuit 89 includes a combining circuit unit (included in the image combining unit) that combines, on a line by line basis, a digital image signal received from the delay circuit 88 with a digital image signal received from the A/D converting circuit 87.

The image processing circuit 89 generates digital image data from the digital image signals of each one line sequentially acquired by the combining circuit unit so as to obtain the entire document image. A combining circuit including the combining circuit unit may be independently arranged and an image processing circuit may be arranged downstream of the combining circuit.

The feed clutch 93 connects the conveyance drive roller 26A with the stepping motor 91. The rotational power of the stepping motor 91 is transmitted only if the feed clutch 93 is engaged.

The discharge clutch 94 connects the conveyance drive roller 30A with the stepping motor 91. The rotational power of the stepping motor 91 is transmitted only if the discharge clutch 94 is engaged.

Although not illustrated, the operation display unit 81 includes a groups of keys, such as a start/stop key, numeric keypad, function key, Yes/No key, and cursor key, a display device, such as LCD or LED, an audio output device, and the like. The operation display unit 81 has a mode setting function, an operation-start instructing function, and the like.

Next, an explanation is given of a method of attaching the conveyance drive roller 26A to the rotary shaft 65. Because the method of attaching the conveyance drive roller 30A to the rotary shaft 65 is the same as the method of attaching the conveyance drive roller 26A to the rotary shaft 65, its explanation is omitted.

To fix the conveyance drive roller 26A to the rotary shaft 65 with the screws 66, first, the rotary shaft 65 is inserted into a plurality of (eight) conveyance drive rollers 26A through the through-holes 26e. At that time, the positions of the through-holes 26d of the conveyance drive rollers 26A are alternately located on opposite sides in a direction perpendicular to the axis direction of the rotary shaft 65.

Afterward, the screw 66 is inserted through the through-hole 26d of the small-diameter rotary portion 26b from one side in a direction perpendicular to the axis direction of the rotary shaft 65, and the screw 66 is fastened into the screw hole 65a. Then, the screw 66 is inserted through the through-hole 26d of the small-diameter rotary portion 26b of the conveyance drive roller 26A, which is adjacent to the above fastened conveyance drive roller 26A, from the other side in a direction perpendicular to the axis direction of the rotary shaft 65, and the screw 66 is fastened into the screw hole 65b.

Next, the screw 66 is inserted through the through-hole 26d of the small-diameter rotary portion 26b of the conveyance drive roller 26A, which is adjacent to the above conveyance drive roller 26A fixed to the rotary shaft 65 with the screw 66, from one side in a direction perpendicular to the axis direction of the rotary shaft 65, and the screw 66 is fastened into the screw hole 65a. These screw fastening operations are alternately performed on one side and the other side in a direction perpendicular to the axis direction of the rotary shaft 65, whereby the conveyance drive roller 26A is attached to the rotary shaft 65.

As a result, the conveyance drive roller 26A is attached to the rotary shaft 65 such that the positions of the head portions 66a of the screws 66 are alternately located, along the axis direction of the rotary shaft 65, on opposite sides of the outer circumference surface in a direction perpendicular to the axis direction of the rotary shaft 65.

Next, an explanation is given of an operation for conveying a document during image reading according to the present embodiment.

When a document is inserted from the document placement board 25 or inserted in the conveying direction (to the right in FIGS. 1 and 2), the first document sensor 63 detects the leading edge of the document and is switched on.

When a predetermined time has elapsed during which the leading edge of the document comes into contact with the pair of conveying rollers 26, the stepping motor 91 is normally rotated under the control of the control unit 80, and the feed clutch 93 is engaged so that the driving force is transmitted to the conveyance drive roller 26A. Thus, the conveyance drive roller 26A is rotated in the conveying direction.

Then, when the second document sensor 64 detects the leading edge of the document, the light sources 92 of the first read sensor 28 and the second read sensor 29 are turned on in synchronization with the driving of the stepping motor 91, and the discharge clutch 94 is engaged so that the driving force is transmitted to the pair of conveying rollers 30; thus, the conveyance drive roller 30A and the conveyance follower roller 30B are rotated in the conveying direction.

During the document conveying process, the first read sensor 28 and the second read sensor 29 read a document image, which is divided in the main-scanning direction, in the area between the contact glass 61 and the pressure plate 62. After the document has been read, the light source 92 is turned off.

The feed clutch 93 is disengaged when the document passes through the pair of conveying rollers 26.

Then, the second document sensor 64 detects the trailing edge of the read document, and, just before the trailing edge of the read document passes through the pair of conveying rollers 30, the stepping motor 91 is turned off and the discharge clutch 94 is disengaged.

Thus, the rotation of the pair of conveying rollers 30 is stopped so that the trailing edge of the document is nipped between the pair of conveying rollers 30.

Then, the conveying operation during the document reading process is terminated, and a stand-by state is set.

Next, an explanation is given of image processing performed on a document image read by the first read sensor 28 and the second read sensor 29 during the above-described document reading process.

A document image read by the first read sensor 28 on a line by line basis is input to the analog processing circuit 83 as an analog image signal.

Then, the analog processing circuit 83 adjusts the level of the analog image signal received from the first read sensor 28 and performs, for example, sample and hold or variable gain amplification (AGC) processing, and sends the processed analog image signal to the A/D converting circuit 84.

Then, the A/D converting circuit 84 converts the analog image signal received from the analog processing circuit 83 into an 8-bit digital image signal and sends it to the delay circuit 88.

The delay circuit 88 stores in a memory of the delay circuit 88 the digital image signal received from the A/D converting circuit 84 and, after the delay time T elapses, sends the digital image signal to the image processing circuit 89.

The delay time T is set in accordance with the interval between the first read sensor 28 and the second read sensor 29 such that digital image signals are input to the image processing circuit 89 from the delay circuit 88 and the A/D converting circuit 87 in synchronization.

In the present embodiment, if the outer diameters of the large-diameter rotary portions 26a and 30a of the conveyance drive rollers 26A and 30A are changed due to the surrounding temperature environment, the length in the document conveying direction of the bracket 67 is also changed; therefore, it is not necessary to make a significant change to the set delay time T in accordance with changes in the outer diameters of the large-diameter rotary portions 26a and 30a.

The analog processing circuit 86 receives, as an analog image signal, a document image that is read by the second read sensor 29 on a line by line basis on the side downstream of the first read sensor 28 in the conveying direction.

The analog processing circuit 86 then adjusts the level of an analog image signal received from the second read sensor 29 and performs, for example, sample and hold or variable-gain amplification (AGC) processing, and sends the processed analog image signal to the A/D converting circuit 87.

Then, the A/D converting circuit 87 converts the analog image signal received from the analog processing circuit 86 into an 8-bit digital image signal and sends it to the image processing circuit 89.

When the image processing circuit 89 receives digital image signals on a line by line basis from the delay circuit 88 and the A/D converting circuit 87 in synchronization, the combining circuit unit sequentially combines the digital image signals to obtain digital image data of one line and combines sets of digital image data of lines so as to generate digital image data on the document. The generated digital image data is stored in a storage device (not shown).

As described above, the digital copier 21 of the present embodiment includes the first read sensor 28, which reads a first region of a document divided in the main scanning direction; the second read sensor 29, which is located downstream in the sub-scanning direction of the first read sensor 28 and reads a second region of the document other than the first region read by the first read sensor 28; the conveyance drive rollers 26A and 30A, which are made of resin and have outer circumference surfaces in contact with a document during conveyance of the document; the rotary shaft 65, which extends in the main scanning direction and to which the conveyance drive rollers 26A and 30A are fixed with a space interposed therebetween in the axis direction of the rotary shaft 65 so that the conveyance drive rollers 26A and 30B are rotated; and the conveyance follower rollers 26B and 30B, which are in contact with the conveyance drive rollers 26A and 30A and are rotated together with them. The digital copier 21 further includes the conveying unit that conveys a document to the first read sensor 28 and the second read sensor 29; the brackets 67 to which the first read sensor 28 and the second read sensor 29 are attached, respectively, so that the first read sensor 28 and the second read sensor 29 are maintained with a certain interval interposed therebetween; the delay circuit 88, which delays an output signal from the first read sensor 28 according to the set interval between the first read sensor 28 and the second read sensor 29 in the sub-scanning direction; and the image processing circuit 89, which combines an output signal that has been output from the first read sensor 28 and delayed by the delay circuit 88 with an output signal output from the second read sensor 29 so as to obtain image signals. The linear coefficients of expansion of the conveyance drive rollers 26A and 30A and the brackets 67 are determined such that the amount of change in the outer diameter of each of the conveyance drive rollers 26A and 30A is substantially the same as the amount of change in the interval between the first read sensor 28 and the second read sensor 29 if the outer diameters of the conveyance drive rollers 26A and 30A expand or contract due to a change in the temperature environment of the digital copier 21 and therefore the document conveying speed is changed.

Thus, the set interval between the first read sensor 28 and the second read sensor 29 can be changed in accordance with a change in the conveying speeds of the conveyance drive rollers 26A, 30A.

When the delay time pre-set in the delay circuit 88 is used, it is possible to prevent the occurrence of image misalignment in the conveying direction when a partial image (a first region of an image) read by the first read sensor 28 is combined with another partial image (a second region of the image other than the first region of the image) read by the second read sensor 29.

In the present embodiment, the conveyance drive rollers 26A are attached to the rotary shaft 65 such that the positions of the head portions 66a of the screws 66 are alternately located along the axis direction of the rotary shaft 65 on opposite sides of the outer circumference surface in a direction perpendicular to the axis direction of the rotary shaft 65; therefore, when the conveyance drive rollers 26A and 30A are fixed to the rotary shaft 65 with the screws 66, the screw fastening forces can be applied from one side of the outer circumference surface and from the other side of the outer circumference surface.

Thus, it is possible to prevent the rotary shaft 65 from warping and to prevent the rotary shaft 65 from moving in a direction perpendicular to the rotation center of the rotary shaft 65 during the rotation of the rotary shaft 65.

Therefore, it is possible to reduce any variation in the interval between the first read sensor 28 and the second read sensor 29 in accordance with a change in the conveying speeds of the pair of conveying rollers 26 and 30 to such a degree that image misalignment in the conveying direction does not occur at the image connection area. As a result, the quality of read images can be reliably maintained.

If a large number of conveyance drive rollers 26A and 30A are attached to a longer rotary shaft 65, warping of the rotary shaft 65 can be avoided; therefore, the quality of read images of a document with a larger reading width can be reliably maintained.

In the present embodiment, because the coating layers 26f and 30f with high frictional resistance are formed on the outer circumference surfaces of the large-diameter rotary portions 26a and 30a, which are in contact with a document, the outer circumferences of the large-diameter rotary portions 26a and 30a can be in contact with the document via the coating layers 26f and 30f with a high friction and therefore it is ensured that the document can be conveyed.

Here, an explanation is given of the optimal combination of the thicknesses and the linear coefficients of expansion of the coating layers 26f and 30f and the diameters and the linear coefficients of expansion of the large-diameter rotary portions 26a and 30a.

Figure 13:
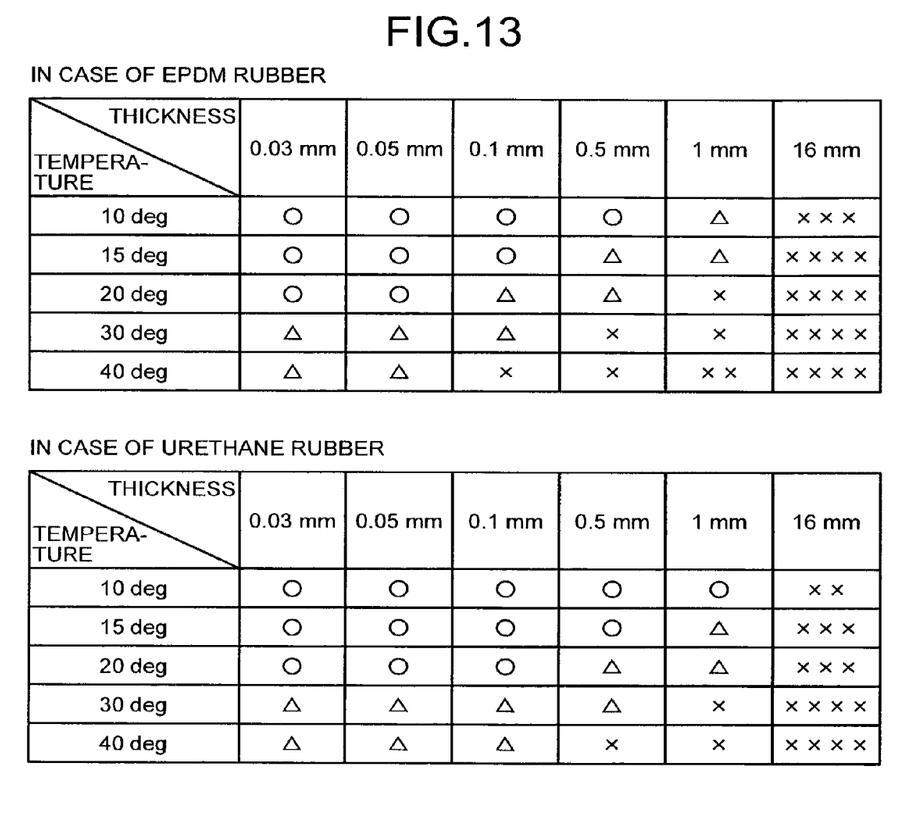
FIG. 13 is a diagram that illustrates an embodiment of the image reading apparatus and the image forming apparatus according to the present invention and that explains the relation between the temperature and the thickness of EPDM rubber or urethane rubber that is optimally combined with the conveyance drive roller when the diameter of the conveyance drive roller satisfies a specific condition.

Consideration is given to a case where the outer diameters of the large-diameter rotary portions 26a and 30a of the conveyance drive rollers 26A and 30A are 32 mm, the linear coefficient of expansion of a resin material of the large-diameter rotary portions 26a and 30a is 0.000020/deg, and EPDM rubber or urethane rubber is used for the coating layers 26f and 30f, which have high frictional resistance, as illustrated in FIG. 13.

FIG. 13 is a table that illustrates the relation between a change in the temperature and the thickness of EPDM rubber or urethane rubber. The mark "○" indicates that image misalignment in the conveying direction at the connection area of the first read sensor 28 and the second read sensor 29 is equal to or less than 5 μm, the mark "Δ" indicates that the image misalignment in the conveying direction at the connection area of the first read sensor 28 and the second read sensor 29 is equal to or less than 10 μm (about ¼ dot), the mark "x" indicates that the image misalignment in the conveying direction at the connection area of the first read sensor 28 and the second read sensor 29 is equal to or less than 20 μm (about ½ dot), the mark "xx" indicates the image misalignment in the conveying direction at the connection area of the first read sensor 28 and the second read sensor 29 is equal to or less than 40 μm (about 1 dot), and the mark "xxx" indicates that the image misalignment in the conveying direction at the connection area of the first read sensor 28 and the second read sensor 29 is equal to or greater than 40 μm.

Consideration is given to a case where the diameters of the large-diameter rotary portions 26a and 30a of the conveyance drive rollers 26A and 30A, which are made of PPS, are 32 mm, the linear coefficients of expansion of the large-diameter rotary portions 26a and 30a are 0.000020/deg, the interval between the first read sensor 28 and the second read sensor 29 in the sub-scanning direction is 27 mm, the thicknesses of the coating layers 26f and 30f are 0.03 mm, the linear coefficient of expansion of the bracket made of a steel plate is 0.0000117/deg, and the change in the temperature of the digital copier 21 is 20 degrees.

At that time, the diameters of the conveyance drive rollers 26A and 30A are changed in the sub-scanning direction by about 10.8 μm due to heat expansion, and, because of heat expansion of the bracket 67, the interval between the first read sensor 28 and the second read sensor 29 is changed by 6.3 μm.

In this case, if a document is read with resolution of 600 dpi (one dot is 42.3 μm), the amount of image misalignment in the conveying direction is reduced to "10.8 μm−6.3 μm=4.5 μm", which results in unnoticeable image misalignment in the conveying direction at the connection area of the first read sensor 28 and the second read sensor 29.

Therefore, in consideration of the diameters and the linear coefficients of expansion of the large-diameter rotary portions 26a and 30a as described above, if the thicknesses of the coating layers 26f and 30f are equal to or less than 0.05 mm as illustrated in FIG. 13, and even if the outer diameters of the large-diameter rotary portions 26a and 30a are changed due to a change in the temperature environment of the digital copier 21, noticeable image misalignment in the conveying direction does not occur at the connection area of the first read sensor 28 and the second read sensor 29.

Thus, it is preferable that the thicknesses of the coating layers 26f and 30f are set to be an optimal thicknesses in consideration of the diameters and the linear coefficients of expansion of the large-diameter rotary portions 26a and 30a.

In the present embodiment, because the inside of each of the large-diameter rotary portions 26a and 30a of the conveyance drive rollers 26A and 30A is hollow, the weights of the conveyance drive rollers 26A and 30A can be further reduced, and warping of the rotary shaft 65 due to the weight of the conveyance drive rollers 26A and 30A can be prevented.

Figure 14:
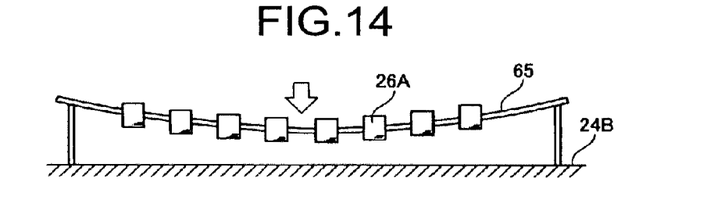
FIG. 14 is a diagram that illustrates an embodiment of the image reading apparatus and the image forming apparatus according to the present invention and that illustrates a state where the rotary shaft warps due to the weight of the conveyance drive rollers.

Specifically, as illustrated in FIG. 14, when a large number of conveyance drive rollers 26A are fixed to the rotary shaft 65 in the axis direction of the rotary shaft 65, if the conveyance drive rollers 26A are supported by the lower structural body 24B at both ends, the rotary shaft 65 may warp due to the weight of the conveyance drive rollers 26A.

Figure 15:
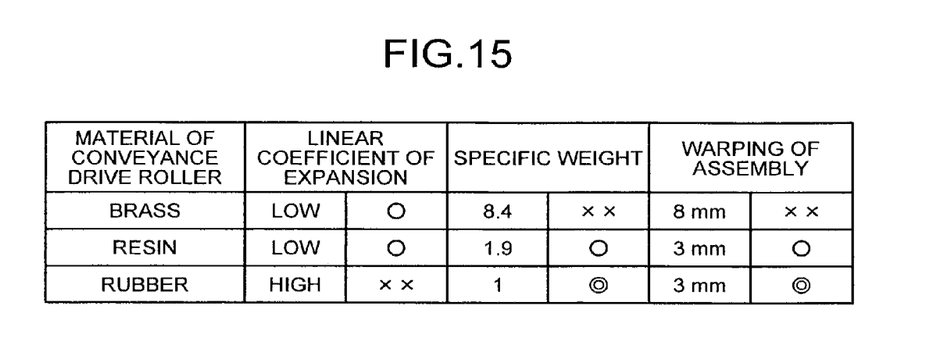
FIG. 15 is a diagram that illustrates an embodiment of the image reading apparatus and the image forming apparatus according to the present invention and that explains the appropriateness of the linear coefficient of expansion, the specific weight, and the amount of warping of the assembly of the conveyance drive roller and the drive shaft with respect to the material from which the conveyance drive roller is made.

FIG. 15 illustrates the linear coefficients of expansion, the specific weights, and the amounts of warping (the difference in height between ends of the rotary shaft 65 and the central portion of the rotary shaft 65 in the axis direction) of the rotary shaft 65 in the assembly in which the conveyance drive rollers are attached to the rotary shaft 65 when the material of the conveyance drive roller is brass, resin, or rubber. The mark "double circle" indicates most suitable, the mark "○" indicates suitable, and the mark "x" indicates not suitable.

As illustrated in FIG. 15, as for the linear coefficient of expansion, because the linear coefficient of expansion of the bracket 67 made of a steel plate is substantially the same as that of brass or resin, the amount of change in the outer diameter of a conveyance drive roller made of brass or resin can be substantially the same as the amount of change in the interval between the first read sensor 28 and the second read sensor 29; thus, it is possible to avoid the occurrence of image misalignment in the conveying direction at the image connection area.

In contrast, the linear coefficient of expansion of rubber is one order of magnitude higher than that of a steel plate: therefore, in the case of a conventional conveyance drive roller made of rubber, the amount of change in the outer diameter of the conveyance drive roller is significantly different from the amount of change in the interval between the first read sensor 28 and the second read sensor 29, and image misalignment in the conveying direction occurs at the image connection area.

Because the specific weight of a conveyance drive roller made of brass is four to eight times higher than that of a conveyance drive roller made of resin or rubber, the rotary shaft 65 to which the conveyance drive roller is attached warps (the amount of warping is about 8 mm).

In contrast, because the specific weight of a conveyance drive roller made of resin or rubber is four to eight times lower than that of a conveyance drive roller made of brass, warping of the rotary shaft 65 to which the conveyance drive roller is attached can be reduced (the amount of warping is about 3 mm).

However, although the weight of a conveyance drive roller made of rubber can be reduced, there is a possibility that the amount of change in the outer diameter of the conveyance drive roller is significantly different from the amount of change in the interval between the first read sensor 28 and the second read sensor 29, as described above.

Therefore, as described in the present embodiment, it is preferable that a conveyance drive roller is made of resin so that the amount of change in the outer diameter of the conveyance drive roller is substantially the same as the amount of change in the interval between the first read sensor 28 and the second read sensor 29 and so that the occurrence of warping of the rotary shaft 65 is prevented.

In addition, according to the present embodiment, because the inside of each of the large-diameter rotary portions 26a and 30a of the conveyance drive rollers 26A and 30A, which are lightweight and are made of resin, is hollow, the weights of the conveyance drive rollers 26A and 30A can be further reduced; thus, avoidance of warping of the rotary shaft 65 can be ensured.

Thus, during the rotation of the rotary shaft 65, avoidance of movement of the rotary shaft 65 in a direction perpendicular to the rotation center can be ensured.

Because the conveyance drive rollers 26A and 30A are made of resin, cutting processability can be improved, and the material cost can be lower than that of metal.

In the present embodiment, in order to use the first read sensor 28 and the second read sensor 29 to read a document divided in the main scanning direction, the first read sensor 28 and the second read sensor 29, each with a narrower width than the maximum document width, are arranged in a staggered manner; thus, it is possible to reduce the cost of components compared to a case where a single reading unit with a width corresponding to the maximum document width is used.

Although the conveyance drive rollers 26A and 30A are made of PPS in the present embodiment, any other resin material may be used as long as it has a similar linear coefficient of expansion to a metal material from which the bracket 67 is made.

Each of the screw holes 65a and 65b is a through-hole that passes through in a direction perpendicular to the axis direction of the rotary shaft 65; however, the screw holes may be formed as a hole with a predetermined depth on one side of the outer circumference surface in a direction perpendicular to the axis direction of the rotary shaft 65 and as a hole with a predetermined depth on the other side of the outer circumference surface in a direction perpendicular to the axis direction of the rotary shaft 65.

As described above, it is possible to provide an image reading apparatus and an image forming apparatus that can ensure a flexible response to a change in the outer diameter of a conveyance drive roller and can reliably maintain the quality of read images.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading apparatus comprising:
a first reading unit that reads a first region of a document that is divided in a main scanning direction;
a second reading unit that is located downstream in a sub-scanning direction of the first reading unit and that reads a second region of the document other than the first region of the document;

a conveying unit that conveys a document to the first reading unit and the second reading unit, the conveying unit including:
  a plurality of conveyance drive rollers made of resin and that each having an outer circumference surface in contact with a document during conveyance of the document;
  a rotary shaft which extends in the main scanning direction and to which the conveyance drive rollers are attached in an axis direction of the rotary shaft with a space interposed therebetween, the rotary shaft rotating the conveyance drive rollers; and
  a plurality of conveyance follower rollers that are rotated together with the conveyance drive rollers;
a holding unit which is made of metal and to which the first reading unit and the second reading unit are fixed in a manner to maintain a certain interval between the first reading unit and the second reading unit;
a delay unit that delays an output signal from the first reading unit in accordance with the interval between the first reading unit and the second reading unit in the sub-scanning direction; and
an image combining unit that combines the output signal that has been output from the first reading unit and delayed by the delay unit with an output signal from the second reading unit so as to obtain image signals, wherein
linear coefficients of expansion of the conveyance drive rollers and a linear coefficient of expansion of the holding unit are determined such that an amount of change in an outer diameter of each of the conveyance drive rollers due to a change in temperature environment is substantially the same as an amount of change in the interval between the first reading unit and the second reading unit due to a change in the temperature environment,
the rotary shaft has a plurality of screw fastening portions formed in the axis direction of the rotary shaft with a space interposed between each of the screw fastening portions,
the conveyance drive roller includes:
  a large-diameter rotary portion that has an outer circumference surface in contact with a document;
  a small-diameter rotary portion that is protruded from the large-diameter rotary portion in the main scanning direction and that has a smaller diameter than the large-diameter rotary portion; and
  a through-hole that is formed on the small-diameter rotary portion and through which a screw is inserted so as to be fastened into the screw fastening portion, and
the conveyance drive rollers are attached to the rotary shaft such that positions of head portions of the screws are alternately located along the axis direction of the rotary shaft on opposite sides of the outer circumference surface in a direction perpendicular to the axis direction of the rotary shaft.

2. The image reading apparatus according to claim 1, wherein the large-diameter rotary portion has a coating layer formed on the outer circumference surface thereof, the coating layer having high frictional resistance.

3. The image reading apparatus according to claim 2, wherein the large-diameter rotary portion is made of a material that maintains the accuracy of the outer diameter thereof after having undergone a baking process that is for the coating layer.

4. The image reading apparatus according to claim 1, wherein an inside of the large-diameter rotary portion is hollow.

5. An image forming apparatus comprising:
  the image reading apparatus according to claim 1; and
  an image forming unit that combines images read by the image reading apparatus and forms the images on a predetermined recording medium.

\* \* \* \* \*